United States Patent
Hosono et al.

(10) Patent No.: US 10,759,668 B2
(45) Date of Patent: Sep. 1, 2020

(54) SUPPORTED METAL MATERIAL, SUPPORTED METAL CATALYST, AND AMMONIA SYNTHESIS METHOD USING THE SAME

(71) Applicants: JAPAN SCIENCE AND TECHNOLOGY AGENCY, Kawaguchi-shi (JP); TOKYO INSTITUTE OF TECHNOLOGY, Meguro-ku (JP)

(72) Inventors: Hideo Hosono, Tokyo (JP); Michikazu Hara, Tokyo (JP); Masaaki Kitano, Tokyo (JP); Hiroshi Mizoguchi, Tokyo (JP); Toshiharu Yokoyama, Tokyo (JP); Kyosuke Yamagata, Tokyo (JP)

(73) Assignees: JAPAN SCIENCE AND TECHNOLOGY AGENCY, Kawaguchi-shi (JP); TOKYO INSTITUTE OF TECHNOLOGY, Meguro-ku (JP)

( * ) Notice: Subject to any disclaimer, the term of this patent is extended or adjusted under 35 U.S.C. 154(b) by 113 days.

(21) Appl. No.: 15/774,195

(22) PCT Filed: Nov. 9, 2016

(86) PCT No.: PCT/JP2016/083156
§ 371 (c)(1),
(2) Date: May 7, 2018

(87) PCT Pub. No.: WO2017/082265
PCT Pub. Date: May 18, 2017

(65) Prior Publication Data
US 2018/0327272 A1    Nov. 15, 2018

(30) Foreign Application Priority Data
Nov. 10, 2015 (JP) .................. 2015-220486

(51) Int. Cl.
*C01C 1/04* (2006.01)
*B01J 37/04* (2006.01)
(Continued)

(52) U.S. Cl.
CPC .......... *C01C 1/0411* (2013.01); *B01J 23/462* (2013.01); *B01J 23/58* (2013.01); *B01J 35/002* (2013.01);
(Continued)

(58) Field of Classification Search
CPC ...... C01C 1/0411; C01C 1/04; B01J 35/1009; B01J 37/18; B01J 35/002; B01J 37/08;
(Continued)

(56) References Cited

U.S. PATENT DOCUMENTS

2013/0108924 A1   5/2013  Nakayama et al.
2013/0183224 A1   7/2013  Hosono et al.
(Continued)

FOREIGN PATENT DOCUMENTS

CN    1413908 A        4/2003
CN    103977282 A  *   8/2014
(Continued)

OTHER PUBLICATIONS

International Search Report dated Dec. 6, 2016 in PCT/JP2016/083156 filed Nov. 9, 2016.
(Continued)

*Primary Examiner* — Anthony J Zimmer
(74) *Attorney, Agent, or Firm* — Oblon, McClelland, Maier & Neustadt, L.L.P.

(57) ABSTRACT

The present invention provides a supported metal catalyst, a method for synthesizing ammonia using said catalyst, and a supported metal material in which a transition metal is supported on a support, wherein the support is a metal hydride represented by general formula (1): $XH_n$ . . . (1); and
(Continued)

in general formula (1), X represents at least one selected from the group consisting of atoms from Groups 2 and 3, and lanthanoid atoms, and n is in a range of 2<n<3.

8 Claims, 2 Drawing Sheets

(51) Int. Cl.

| | |
|---|---|
| *B01J 23/58* | (2006.01) |
| *B01J 37/08* | (2006.01) |
| *B01J 35/00* | (2006.01) |
| *B01J 37/18* | (2006.01) |
| *B01J 35/10* | (2006.01) |
| *B01J 23/46* | (2006.01) |
| *C01G 55/00* | (2006.01) |
| *B01J 23/78* | (2006.01) |
| *B01J 23/63* | (2006.01) |
| *B01J 23/83* | (2006.01) |

(52) U.S. Cl.
CPC .......... *B01J 35/1009* (2013.01); *B01J 37/04* (2013.01); *B01J 37/08* (2013.01); *B01J 37/18* (2013.01); *C01C 1/04* (2013.01); *C01G 55/008* (2013.01); *B01J 23/63* (2013.01); *B01J 23/78* (2013.01); *B01J 23/83* (2013.01); *C01P 2002/70* (2013.01); *Y02P 20/52* (2015.11)

(58) Field of Classification Search
CPC . B01J 23/58; B01J 23/462; B01J 37/04; B01J 23/83; B01J 23/63; B01J 23/78; C01G 55/008; Y02P 20/52; C01P 2002/70
See application file for complete search history.

(56) References Cited

U.S. PATENT DOCUMENTS

| | | |
|---|---|---|
| 2015/0239747 A1 | 8/2015 | Hosono et al. |
| 2016/0271595 A1 | 9/2016 | Chen et al. |
| 2016/0361712 A1 | 12/2016 | Hosono et al. |
| 2017/0088433 A1 | 3/2017 | Kageyama et al. |
| 2017/0355607 A1 | 12/2017 | Hosono et al. |

FOREIGN PATENT DOCUMENTS

| | | |
|---|---|---|
| EP | 0034403 A1 | 8/1981 |
| EP | 3 081 294 A1 | 10/2016 |
| JP | 56-149315 A | 11/1981 |
| JP | 02-258066 A | 10/1990 |
| JP | 06-079177 A | 3/1994 |
| JP | 07-256104 A | 10/1995 |
| JP | 09-239272 A | 9/1997 |
| JP | 2003-267725 A | 9/2003 |
| JP | 2004-035399 A | 2/2004 |
| JP | 2004-091264 A | 3/2004 |
| JP | 2006-231229 A | 9/2006 |
| JP | 2012-038697 A | 2/2012 |
| JP | 2012-114027 A | 6/2012 |
| JP | 2013-037951 A | 2/2013 |
| JP | 2013-110007 A | 6/2013 |
| JP | 2014-171916 A | 9/2014 |
| WO | WO 2012/077658 A | 6/2012 |
| WO | WO 2014/034473 A1 | 3/2014 |
| WO | WO 2015/085623 A1 | 6/2015 |
| WO | WO 2015/129471 A1 | 9/2015 |
| WO | WO 2015/136954 A1 | 9/2015 |
| WO | WO 2016/088896 A1 | 6/2016 |

OTHER PUBLICATIONS

Kitano, M., "Ammonia synthesis using a stable electride as an electron donor and reversible hydrogen store", Nature Chemistry, Articles Published Online: Oct. 21, 2012, 7 Pages.

Bos, W. G., "The Rare Earth Hydrides", Journal of Nuclear Materials, vol. 18, No. 1, 1966, 30 Pages.

Kojima, R. et al., "Rhenium containing binary catalysts for ammonia synthesis", Applied Catalysis A: General 209, (2001), pp. 317-325.

Kojima, R., et al., "Cesium-promoted rhenium catalysts supported on alumina for ammonia synthesis", Applied Catalysis A: General 246 (2003), pp. 311-322.

Siporin, S. E. et al., "Use of kinetic models to explore the role of base promoters on Ru/MgO ammonia synthesis catalysts", Journal of Catalysis 225, (2004), pp. 359-368.

George, L. et al, "Structural stability on metal hydrides, alanates and borohydrides of alkali and alkali-earth elements: A review", International Journal of Hydrogen Energy 35, (2010), pp. 5454-5470.

Extended European Search Report dated May. 15, 2019 in European Patent Application No. 16864226.2 citing documents AA-AB and AO-AQ therein, 6 pages.

Office Action dated Apr. 10, 2020 in Chinese Patent Application No. 201680065123.0 (w/ partial English translation).

\* cited by examiner

SUPPORTED METAL MATERIAL, SUPPORTED METAL CATALYST, AND AMMONIA SYNTHESIS METHOD USING THE SAME

TECHNICAL FIELD

The present invention provides a supported metal material, a supported metal catalyst and an ammonia synthesis method using the supported metal catalyst.

Priority is claimed on Japanese Patent Application No. 2015-220486 filed Nov. 10, 2015, the content of which is incorporated herein by reference.

BACKGROUND

As a typical ammonia synthesis method, the Haber-Bosch method uses doubly promoted iron catalyst containing several percent by mass of $Al_2O_3$ and $K_2O$ in $Fe_3O_4$ as a catalyst, and brings a mixed gas of nitrogen and hydrogen into contact with the catalyst under high temperature and high pressure conditions to produce ammonia. This technology is widely used industrially in the production process as almost the same as it was completed.

On the other hand, a method of producing ammonia at a temperature lower than the reaction temperature of the Haber-Bosch method has been studied. Catalysts capable of producing ammonia by contacting with nitrogen and hydrogen have been investigated, and transition metals have been studied as their catalytically active components. Among them, a method using ruthenium (Ru) as a catalyst active component on various catalyst supports and using it as a catalyst for ammonia synthesis has been proposed as an efficient method (for example, Patent Document 1).

It is known that a catalyst using a transition metal such as Ru has very high activity and ammonia can be produced under milder conditions than the reaction conditions used in the Harbor-Bosch method. For example, it is known that the reaction proceeds even at a low temperature in the range of the reaction temperature 200-400° C. and under a low pressure in the range from atmospheric pressure to about 1.1 MPa.

A calcium aluminosilicate constituted by CaO, $Al_2O_3$, and $SiO_2$, which has the same type crystal structure as Mayenite is called a "Mayenite type compound". The representative composition of the mayenite type compound is represented by $12CaO.7Al_2O_3$ and the mayenite type compound has a structure in which two oxygen atoms are included as "free oxygen" in a space of a cage formed by its crystal skeleton.

The present inventors have found that a catalyst in which a transition metal is supported as a catalytically active component on a Mayenite compound in which free oxygens in the Mayenite type compound are substituted with electrons (hereinafter referred to as C12A7 electride) has a high activity as a catalyst for ammonia synthesis. (Patent Document 2, Non-Patent Document 1).

Furthermore, the present inventors have found that a supported metal catalyst using a compound such as a metal amide compound has high activity as a catalyst for ammonia synthesis. (Patent Documents 3 and 4).

These catalysts have sufficient reactive activity even under a reaction condition of lower temperature and lower pressure than the reaction condition of the Haber-Bosch method.

On the other hand, various metal hydrides are known and used for various purposes (Non-Patent Document 2). The metal hydrides are usually obtained by heating a metal in a hydrogen atmosphere.

For example, an alkaline earth metal hydride such as $CaH_2$ is used as a drying agent or a reducing agent for a solvent because it reacts with water to generate hydrogen. Since a rare earth metal hydride such as $LaH_2$ absorbs more hydrogen atoms into its molecule and becomes an ultrahigh concentration hydride, so the rare earth metal hydride is used as a hydrogen storage and/or release material. The metal hydride is also used as a material for manufacturing a nitride phosphor, an electron-emitting electrode, and the like.

Patent Document 1: Japanese Unexamined Patent Application, First Publication No. 2006-231229
Patent Document 2: WO 2012/077658
Patent Document 3: WO 2014/034473
Patent Document 4: WO 2016/088896
Non-Patent Document 1: Kitano, M., Inoue, Y., Yamazaki, Y., Hayashi, F., Kanbara, S., Matsuishi, S., Yokoyama, T., Kim, S. W., Hara, M., Hosono, H., "Nature Chemistry" 4, 934-940 (2012).
Non-Patent Document 2: W. G. Bos, K. H. Gayer, "Journal of Nuclear Materials", Vol. 18, Issue 1, p. 1-30 (1966).

DISCLOSURE OF INVENTION

Although the ammonia synthesis by the Harber-Bosch method using a doubly promoted iron catalyst has been put into practical use, it requires a high temperature and pressure condition. Therefore, there is a problem that the burden on an apparatus and the cost is high.

The supported metal catalyst as disclosed in Patent Document 1 uses a carbonaceous support such as activated carbon or an inorganic oxide support. However, the supported metal catalysts have a low reaction activity and has an insufficient performance for practical use.

That is, a catalyst for ammonia synthesis having a sufficient reactivity even under a condition of lower temperature and lower pressure, than the reaction conditions of the Harbor-Bosch method, is required.

Although the catalysts disclosed in Patent Documents 2 to 4 have sufficient reaction activity even under reaction conditions of low temperature and low pressure, a catalyst for ammonia synthesis which not only has a high reaction activity, but also can be produced by a simpler method than the catalysts, is required.

On the other hand, using a metal hydride as a catalyst has not been studied.

The inventors of the present invention found that a supported metal material which contains a transition metal supported on a metal hydride can be produced by a simple method. The inventors of the present invention also found that the supported metal material has a high catalytic activity when it is used as a catalyst, and can become an ammonia synthesis catalyst having a high performance. As a result, the present invention was found.

Specifically, that is, the subject matter of the present invention is represented by the following [1] to [10]:

[1] A supported metal material comprising:
a transition metal,
a support loading the transition metal,
wherein the support is a metal hydride represented by the following general formula (1):

$$XH_n$$ (1); and in the general formula (1), X represents at least one atom selected from the group consisting of atoms from Groups 2 and 3 of the periodic table and lanthanoid atoms, and n is in a range of 2≤n≤3.

[2] The supported metal material according to [1], wherein in the general formula (1), X is at least one atom selected from the group consisting of Mg, Ca, Sr, Ba, Sc, Y and lanthanoid.

[3] The supported metal material according to [1] or [2], wherein the transition metal is at least one selected from the group consisting of Ru, Co, and Fe.

[4] The supported metal material according to any one of [1] to [3], wherein the transition metal loading amount with respect to the support is 0.01% to 30 mass %.

[5] A supported metal catalyst, which is the supported metal material according to any one of [1] to [4].

[6] A method of producing ammonia, wherein ammonia is synthesized by bringing a raw material gas containing hydrogen and nitrogen into contact with the supported metal catalyst according to [5].

[7] The method of producing ammonia according to [6], wherein a reaction temperature at the time of bringing the raw material gas into contact with the supported metal catalyst is 100° C. to 600° C.

[8] The method of producing ammonia according to [6] or [7], wherein a reaction pressure at the time of bringing the raw material gas into contact with the supported metal catalyst is 10 kPa to 20 MPa.

[9] The method of producing ammonia according to any one of [6] to [8], wherein a water content of the raw material gas is 100 ppm or less.

[10] The method of producing ammonia according to any one of [6] to [9], wherein a ratio of hydrogen to nitrogen ($H_2/N_2$ (volume/volume)) at the time of bringing the raw material gas into contact with the supported metal catalyst is 0.4 or more.

The supported metal material of the present invention may be used as a supported metal catalyst. When the supported metal material is used as the supported metal catalyst of the present invention, it exhibits a high catalytic activity.

Since the supported metal catalyst of the present invention has a high ammonia synthesis activity even at low reaction temperature and low reaction pressure, the supported metal catalyst of the present invention is particularly suitable as a catalyst for an ammonia synthesis. By producing ammonia using the supported metal catalyst of the present invention, ammonia can be synthesized with less energy and without decrease in catalytic activity even when the synthesis reaction is repeated. Therefore, the supported metal catalyst can be used in producing ammonia high efficiently and with a long term chemical stability.

The supported metal material and the supported metal catalyst of the present invention can be obtained by loading a transition metal on a metal hydride. Although a metal hydride is an active compound having a property such as reacting with moisture, since it can be handled relatively easily, it is possible to produce it in a convenient and highly safe manner. Therefore, it is possible to further reduce the cost.

DESCRIPTION OF THE INVENTION

Figure 1:
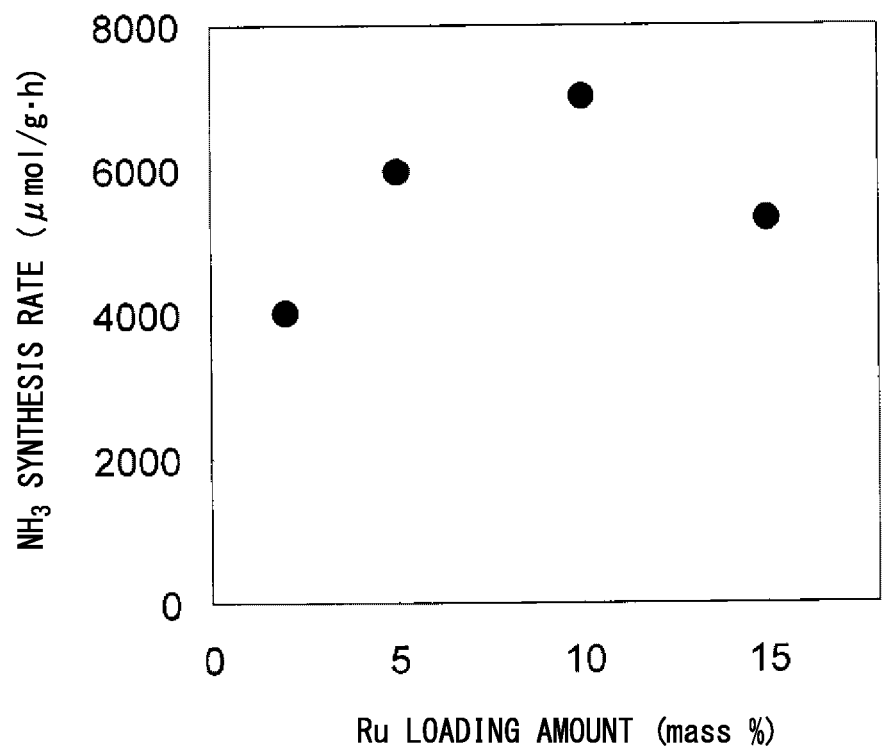
FIG. 1 is a graph showing reaction rates of ammonia synthesis reactions in Example 1 and Examples 4 to 6.

The present invention will be described in detail below.
<Supported Metal Material>

The supported metal material of the present invention contains a transition metal and a support loading the transition metal. The support is a metal hydride represented by the following general formula (1).

$$XH_n \qquad (1)$$

In the general formula (1), X represents at least one atom selected from group consisting of atoms from Groups 2 and 3 of the periodic table and lanthanoid atoms, and n is in a range of 2<n<3.

(Metal Hydride)

The support used in the present invention is a hydride of the metal X.

In the general formula (1), X represents at least one atom selected from the group consisting of atoms from Groups 2 and 3 of the periodic table and lanthanoid atoms.

The atom used for X is not particularly limited, but may be one kind or two or more kinds of elements. When two or more elements are contained, there is no particular limitation, but it is preferable that the two or more elements belong to the same group, or belong to lanthanoid atoms.

As the atoms from Group 2 of the periodic table (hereinafter simply referred to as Group 2 atoms and may be abbreviated as AE), there is no particular limitation, but Mg, Ca, Sr, or Ba may be used preferably, and Ca or Sr may be used more preferably because of high activity when the supported metal material is used as the supported metal catalyst to be described later. Ca may be used most preferably because high activity when the supported metal material is used as the supported metal catalyst to be described later.

As the atoms from Group 3 of the periodic table (hereinafter referred to as Group 3 atoms), although there is not particularly limited, it is preferably Y may be used because it is more abundant.

As the lanthanoid atoms, although there is not particularly limited, La, Ce, Pr, Nd, Sm, Eu, Pr, or Yb may be used preferably because it is a more versatile material. La, Ce, Nd or Sm, which is more abundant, may be used more preferably. La or Ce may be used most preferably because of a high activity when a supported metal material is used as the supported metal catalyst described later.

In the case where X is a lanthanoid atom, it may include a plurality of lanthanoid atoms, and specifically, it may be a Misch Metal. A Misch metal is a common name of an alloy containing a plurality of rare earth elements, and is generally known as an alloy containing Ce as a large amount as its contained component.

The Group 3 atoms and the lanthanoid atoms may be collectively referred to as RE hereinafter.

As the X, the Group 2 atoms or the lanthanoid atoms may be used preferably having a large abundance of elements and having a high activity when the metal-loading material is used as the supported metal catalyst described later, the Group 2 atom may be used more preferably because it is more abundant element.

Further, as the X, Ca, Mg, Sr, Ba, Y or lanthanoid atoms may be used preferably, more preferably Ca, Mg, Sr, Ba, Y, La, Ce, Pr, Nd, Sm, Eu, Pr, or Yb may be used, and most preferably Ca may be used.

In the general formula (I), n represents a numerical value of $2<n<3$.

When X is a Group 2 atom, n is not particularly limited, but it is preferably 2.

When X is a Group 3 atom or a lanthanoid atom, n may be any numerical value between 2 and 3, and preferably 2 or 3.

The AE and RE normally form ionic hydrides. In an ionic hydride, hydrogen exists as a hydride ion ($H^-$ ion). The ionic hydride forms hydrogen ($H_2$) and hydroxide ion ($OH^-$) upon contact with water or an acid.

As a hydride of RE (hereinafter referred to as $REH_n$), a dihydride which is a general hydride and a trihydride which is a high-density hydride are known. It is possible to form dense metal hydrides with values between the dihydride and the trihydride. It is possible to continuously vary the numerical value between the dihydride and the trihydride.

As long as the effect of the present invention is not impaired, a part of the X may further contain atoms other than X, and specifically, it may contain at least one alkali metal atom.

As the metal hydride used in the present invention, it is not particularly limited, but commercially available reagents or industrial raw materials may be used, or a material synthesized by a known method such as heating a corresponding metal under a hydrogen atmosphere may be used.

(Transition Metal)

As the transition metal used in the present invention, it is not particularly limited, but transition metals from Groups 6, 7, 8, 9, or 10 of the periodic table may be used, preferably those from Groups 6, 8, or 9 may be used, and more preferably those from Groups 8 or 9 may be used.

As the specific metal element, it is not particularly limited, but Cr, Mo, Mn, Re, Fe, Ru, Os, Co, Rh, Ni, Pd, or Pt may be used. Mo, Re, Fe, Ru, Os, or Co may be used preferably in view of high bonding energy with nitrogen. Ru, Co, or Fe may be used more preferably in view of catalytic activity on synthesizing ammonia when supported metal material is used as a supported metal catalyst. And, Ru may be used most preferably in view of the highest catalytic activity.

Each of the above elements may be used alone, or two or more of them may be used in combination. Intermetallic compounds of these elements such as $Co_3Mo_3N$, $Fe_3Mo_3N$, $Ni_2Mo_3N$, $Mo_2N$ and the like may also be used. Each element may be used alone or in combination of two or more kinds; and preferably, each element may be used alone in view of cost.

(Composition of Supported Metal Material)

Regarding the supported metal material of the present invention, a transition metal loading amount with respect to the metal hydride is not particularly limited, but it may be 0.01 mass % or more, preferably 0.05 mass % or more, more preferably 0.1 mass % or more. It may be 30 mass % or less, preferably 20 mass % or less, more preferably 15 mass % or less. The effect of the present invention can be obtained if it is not less than the lower limit value, and the effect of the present invention commensurate with the loading amount and cost can be obtained if it is not more than the upper limit value.

The specific surface area of the supported metal material of the present invention is not particularly limited, but it may be 0.1 $m^2/g$ or more, preferably 1 $m^2/g$ or more, and more preferably 3 $m^2/g$ or more.

(Shape of Supported Metal Material)

The shape of the supported metal material of the present invention is not particularly limited, and may be in any form such as lump, powder, coating, etc., but preferably it may be powder. The particle site of the supported metal material powder is not particularly limited, but it may be 10 nm to 50 µm.

The particle diameter of the transition metal in the supported metal material of the present invention is not particularly limited, but it may be 1 to 100 nm. It is preferably 10 nm or less, and more preferably 5 nm or less in view of increasing the number of step sites, which is the active point of nitrogen dissociation when the supported metal material is used as a catalyst for ammonia synthesis.

(Method of Producing Supported Metal Material)

The supported metal material of the present invention is produced by loading the transition metal on the metal hydride. The production method is not particularly limited, but usually it is produced by loading a transition metal or a compound as a precursor of a transition metal (hereinafter referred to as a transition metal compound) on a metal hydride.

As the metal hydride as a raw material of the supported metal material of the present invention, a commercially available reagent or an industrial raw material or a material obtained from a corresponding metal by a known method may be used. The metal hydride may be obtained by heating the corresponding metal under a hydrogen atmosphere.

For example, a calcium hydride ($CaH_2$) can be obtained by heating metallic calcium in a hydrogen atmosphere at about 400° C.

For example, cerium hydride ($CeH_2$) can be obtained by heating metallic cerium to about 700 to 800° C. in a hydrogen atmosphere.

The method of loading the transition metal on the metal hydride used in the present invention is not particularly limited, and a known method may be used. A method of loading a transition metal compound to be supported on the metal hydride and then converting the transition metal compound into a transition metal may be used, wherein the transition metal compound is a compound which can be converted to a transition metal by reduction, thermal decomposition or the like.

As the transition metal compound, it is not particularly limited, but an inorganic compound or an organic transition metal complex of a transition metal easily susceptible to thermal decomposition or the like may be used. Specifically, a complex of transition metal, an oxide of transition metal, a transition metal salt such as a nitrate and a hydrochloride, or the like may be used.

For example, as a Ru compound, triruthenium dodecacarbonyl[$Ru_3(CO)_{12}$], dichloro tetrakis (triphenylphosphine) ruthenium (II)[$RuCl_2(PP_3)_4$], dichloro-tris (triphenylphosphine) ruthenium (II)[$RuCl_2(PPh_3)_3$], tris (acetylacetonato) ruthenium (III)[$Ru(acac)_3$], ruthenocene [$Ru(C_5H_5)$], nitrosyl ruthenium nitrate [$Ru(NO)(NO_3)_3$], potassium ruthenate, ruthenium oxide, ruthenium nitrate, ruthenium chloride, or the like may be used.

As a Fe compound, iron pentacarbonyl [$Fe(CO)_5$], dodecacarbonyl ferric [$Fe_3(CO)_{12}$], nona carbonyl iron [$Fe_2(CO)_9$], tetracarbonyl iron iodide [$Fe(CO)_4I_2$], tris (acetylacetonato) iron(III) [Fe(acac)$_3$], ferrocene [Fe(C$_5$H$_5$)$_2$], iron oxide, iron nitrate, iron chloride(FeCl$_3$), etc.), or the like may be used.

As a Co compound, cobalt octacarbonyl [Co$_2$(CO)$_8$], tris (acetylacetonato) cobalt (III)[Co(acac)$_3$], cobalt (II) acetylacetonate [Co(acac)$_2$], cobaltocene [Co(C$_5$H$_5$)$_2$], cobalt oxide, cobalt nitrate, cobalt chloride, or the like may be used.

A carbonyl complex of transition metal such as [Ru$_3$(CO)$_{12}$], [Fe(CO)$_5$], [Fe$_3$(CO)$_{12}$], [Fe$_2$(CO)$_9$], or [Co$_2$(CO)$_8$] among these transition metal compounds is preferable in view that the reduction treatment to be described later can be omitted in the production of the supported metal material of the present invention because the transition metal may be loaded by loading the carbonyl complex and then heating it.

The amount of the transition metal compound to be used is not particularly limited and may be appropriately selected in order to achieve a desired loading amount, but with respect to the mass of the metal hydride to be used, it may be 0.01 mass % or more, preferably 0.05 mass % or more, more preferably 0.1 mass % or more, and it may be 30 mass % or less, preferably 20 mass % or less, more preferably 15 mass % or less.

As a method of loading the transition metal compound on the metal hydride, specifically, for example, impregnation method, physical mixing method, CVD method (chemical vapor deposition method), sputtering method or the like may be used.

As the impregnation method, the following process may be used. For example, the metal hydride is added to a solution of the transition metal compound and stirred. At this time, the solvent is not particularly limited, and water or various organic solvents may be used, but preferably an organic solvent may be used for suppressing decomposition of the metal hydride. The transition metal compound may be dissolved or dispersed in a solvent.

Next, it is heated in an inert gas stream such as nitrogen, argon, helium, or under vacuum, and as a result, it is dried and solidified. The heating temperature at this time is not particularly limited, but it may be 50 to 300° C. The heating time is not particularly limited, and it may be 30 minutes to 20 hours.

When a transition metal compound which may be converted to a transition metal by pyrolysis is used, at this stage, a transition metal is loaded and it becomes the supported metal material of the present invention.

In the case of using a transition metal compound other than the above-mentioned transition metal compound which may be converted to a transition metal by thermal decomposition, a dried and solidified transition metal compound may be reduced to obtain the supported metal material of the present invention.

A method of reducing the transition metal compound (hereinafter referred to as "reduction treatment") is not particularly limited as long as it does not disturb the object of the present invention, and examples thereof include a method in which the transition metal compound is reduced in an atmosphere containing a reducing gas, and a method in which a reducing agent such as NaBH$_4$. NH$_2$NH$_2$ or formalin is added to the solution of the transition metal compound to precipitate the transition metal on the surface of the metal hydride. However, the method in which the transition metal compound is reduced in an atmosphere containing a reducing gas is preferable. Examples of the reducing gas include hydrogen, ammonia, methanol (vapor), ethanol (vapor), methane, ethane and the like.

During the reduction treatment, a component other than the reducing gas which does not inhibit the object of the present invention, particularly the ammonia synthesis reaction, may coexist with the reaction system. Specifically, at the time of the reduction treatment, in addition to the reducing gas such as hydrogen, a gas such as argon or nitrogen which does not inhibit the reaction may be allowed to coexist, and nitrogen is preferably allowed to coexist.

When the reduction treatment is carried out in a gas containing hydrogen, it can be carried out in parallel with the production of ammonia to be described later by allowing nitrogen to coexist with hydrogen. That is, when the supported metal material of the present invention is used as a catalyst for ammonia synthesis described later, by placing the transition metal compound supported on the metal hydride in the reaction conditions of the ammonia synthesis reaction, the transition metal compound may be reduced and converted to the transition metal.

The temperature during the reduction treatment is not particularly limited, and it may be 200° C. or higher, preferably 300° C. or higher, and may be 1000° C. or lower, preferably 600° C. or lower. When the reduction treatment is carried out within the above reduction treatment temperature range, the growth of the transition metal occurs sufficiently and within a preferable temperature range.

A pressure during the reduction treatment is not particularly limited, but it may be 0.01 to 10 MPa. When the pressure during the reduction treatment is set to the same condition as the ammonia synthesis condition described later, since complicated operations are unnecessary, the pressure range is preferable in view of production efficiency.

A time of the reduction treatment is not particularly limited, but in the case where the reduction treatment is carried out under normal pressure, it may be 1 hour or more, and preferably 2 hours or more.

In the case where the reaction pressure is high, for example, 1 MPa or more, it is preferably 1 hour or more.

The physical mixing method is a method in which the metal hydride and the transition metal compound are mixed in a solid phase and then heated in an inert gas flow such as nitrogen, argon, helium, or under vacuum. The heating temperature and the heating time are the same as those of the impregnation method. The reduction treatment is performed to obtain the supported metal material.

<Supported Metal Catalyst>

The supported metal material of the present invention can be used as a supported metal catalyst.

That is, the supported metal catalyst of the present invention includes a transition metal and a support loading the transition metal, and the support is a metal hydride represented by the following general formula (1).

$$XH_n \tag{1}$$

In the general formula (1), X represents at least one atom selected from group consisting of atoms from Groups 2 and 3 of the periodic table and lanthanoid atoms, and n is in a range of 2<n<3.

X and n are the same as X and n in the supported metal material of the present invention.

The supported metal catalyst of the present invention may be used as it is in the reaction of the supported metal material of the present invention or it may be molded according to the necessity and so long as the effect of the present invention is not impaired, Although it may contain components other than the transition metal, it is preferable to use the supported metal material of the present invention as it is.

As a component other than the metal hydride and the transition metal, $SiO_2$, $Al_2O_3$, $ZrO_2$, MgO, activated carbon, graphite, SiC or the like may be further contained as a support of the metal hydride.

Regarding the supported metal catalyst of the present invention, a transition metal loading amount with respect to the metal hydride is not particularly limited, but it may be 0.01 mass % or more, preferably 0.05 mass % or more, more preferably 0.1 mass % or more. It may be 30 mass % or less, preferably 20 mass % or less, more preferably 15 mass % or less. The effect of the present invention can be obtained if it is not less than the lower limit value, and if it is not more than the upper limit value, the effect of the present invention commensurate with the loading amount and cost can be obtained.

The specific surface area of the supported metal catalyst of the present invention is not particularly limited, but it may be $0.1\ m^2/g$ or more, preferably $1\ ^2/g$ or more, and preferably $3\ m^2/g$ or more.

The shape of the supported metal catalyst of the present invention is not particularly limited, and may be in any form such as lump, powder, coating, etc., but preferably it may be powder. The particle size of the supported metal catalyst powder is not particularly limited, but it may be 10 nm to 50 µm.

A particle diameter of the transition metal in the supported metal catalyst of the present invention is not particularly limited, but it may be 1 nm to 100 nm. It is preferably 10 nm or less, and more preferably 5 nm or less in view of increasing the number of step sites, which is the active point of nitrogen dissociation when the supported metal catalyst is used as a catalyst for ammonia synthesis.

The supported metal catalyst of the present invention can be used as a molded body by using ordinary molding techniques. Specific examples include shapes such as granular, spherical, tablet, ring, macaroni, four leaves, dice, honeycomb, and the like. The supported metal catalyst can also be used after coating it on a suitable substrate. The supported metal catalyst of the present invention can be used as a catalyst for various reactions but it is preferably used as a catalyst for ammonia synthesis reaction. Since the catalyst has high activity of ammonia synthesis, it is possible to produce ammonia with a high reaction efficiency.

When the supported metal catalyst is used as a catalyst for ammonia synthesis, its reaction activity is not particularly limited, but in the case of taking the ammonia synthesis rate at a reaction temperature of 340° C. and a reaction pressure of 0.1 MPa as an example, an ammonia synthesis rate may be 0.5 mmol/g·h or more, preferably 1.0 mmol/g·h or more because it is suitable for practical production conditions, and more preferably 2.0 mmol/g·h or more because it is suitable for more efficient production conditions, and most preferably 3.0 mmol/g·h or more in view of suitability for higher efficiency production conditions.

Further, the supported metal catalyst of the present invention can also be applied to ammonia decomposition which is a reverse reaction of ammonia synthesis. Furthermore, the supported metal catalyst of the present invention can be used for a hydrogenation reaction of an unsaturated carbon compound, for example, a hydrogenation reaction of olefin, acetylene compound, or carbonyl compound; or a nuclear hydrogenation reaction of aromatic compound or heterocyclic compound.

Hereinafter, a method of producing ammonia using the supported metal catalyst of the present invention will be described.

<Production Method of Ammonia>

The method of producing ammonia according to the present invention (hereinafter sometimes referred to as the production method of the present invention) is a method of synthesizing ammonia by using the supported metal catalyst of the present invention as a catalyst and reacting hydrogen and nitrogen on the catalyst.

The specific production method is not particularly limited as long as it is a method of bringing hydrogen and nitrogen into contact with each other on the above-mentioned catalyst to synthesize ammonia, and it may be produced according to a known production method as appropriate.

The ammonia production method of the present invention may include heating the catalyst during hydrogen and nitrogen are being brought into contact on the catalyst to produce ammonia.

The reaction temperature in the production method of the present invention is not particularly limited, it may be 200° C. or more, preferably 250° C. or more, more preferably 300° C. or more and it may be 600° C. or less, preferably 500° C. or less, more preferably 450° C. or less. Although a low-temperature region is advantageous for ammonia generation in terms of chemical equilibrium theory because ammonia synthesis is an exothermic reaction, the temperature range described above is preferred in order to obtain a sufficient ammonia synthesis rate.

In the production method of the present invention, the volume ratio of hydrogen to nitrogen ($H_2/N_2$ (volume/volume)) to be brought into contact with the catalyst is not particularly limited, but it may be 0.4 or more, preferably 0.5 or more, more preferably 1 or more, and it may be 10 or less, preferably 5 or less.

The reaction pressure of the ammonia production method of the present invention is not particularly limited, but a pressure of the gas mixture containing nitrogen and hydrogen may be 0.01 MPa or more, preferably 0.1 MPa or more, and it may be 20 MPa or less, preferably 15 MPa or less, more preferably 10 MPa or less. In view of practical use, a pressure condition equal to or more than atmospheric pressure is preferred.

In the production method of the present invention, before bringing nitrogen and hydrogen into contact with the catalyst, it is preferable to remove water and an oxide adhering from the catalyst by a method using a dehydrating agent, a method of cryogenic separation, a method of using hydrogen gas, or the like. As a removing method, a reduction treatment may be used.

In the production method of the present invention, in order to obtain a better ammonia yield, it is preferable that the water content in nitrogen and hydrogen used in the production method of the present invention is small, and it is not particularly limited, but a total water content in the mixed gas of hydrogen and nitrogen is 100 ppm or less, and preferably 50 ppm or less.

In the production method of the present invention, a form of the reaction vessel is not particularly limited, and a reaction vessel which can be usually used for an ammonia synthesis reaction can be used. As a specific reaction type, for example, a batch type reaction type, a closed circulation type reaction type, a flow type reaction type or the like can be used. From the practical point of view, the flow type reaction type is preferable. In addition, it is possible to use a method of connecting one kind of reactor filled with a catalyst or a plurality of reactors, or a reactor having plural reaction layers in the same reactor.

Since the reaction of synthesizing ammonia from hydrogen and nitrogen is an exothermic reaction accompanied by volumetric shrinkage, it is preferable to industrially remove the heat of reaction in order to increase the ammonia yield, or a known reaction apparatus with a conventional heat removing means may be used. Specifically, for example, a method in which a plurality of reactors filled with a catalyst are connected in series and an intercooler is installed at the outlet of each reactor to remove heat, or the like may be used.

In the ammonia production method of the present invention, the ammonia synthesis catalyst produced by the method of the present invention can be used alone or in combination with other known catalysts which may be used for ammonia synthesis.

EXAMPLE

Hereafter, the present invention will be described in more detail based on examples. An evaluation of the ammonia synthesis activity of the catalyst was carried out by determining the ammonia synthesis rate by quantified the production of $NH_3$ by using a gas chromatograph or quantified the solution in which $NH_3$ was dissolved in the sulfuric acid aqueous solution by using ion chromatography.

(Method of Measuring BET Specific Surface Area)

BET specific surface area was measured by adsorbing nitrogen gas at liquid nitrogen temperature on the surface of the object and calculating BET specific surface area from the adsorption-desorption isothermal curve based on the adsorption-desorption of nitrogen gas at $-196°$ C. Measurement conditions are shown below.

[Measurement Conditions]

Measurement device: high-speed and specific surface area/pore distribution measuring apparatus BELSORP-mini 2 (MicrotracBEL Co., Ltd.)

Adsorbed gas: nitrogen 99.99995% by volume

Adsorption temperature: liquid nitrogen temperature $-196°$ C.

(Ion Chromatogram Analysis)

The ammonia gas discharged from the reaction vessel was dissolved in a 5 mM aqueous solution of sulfuric acid, and captured ammonium ion ($NH_4^+$) was analyzed by ion chromatography.

Measurement conditions are shown below.

[Measurement Conditions]

Apparatus: Shimadzu Corporation Prominence

Detector: electric conductivity detector CDD-10Avp (Shimadzu Corporation)

Column: Ion chromatogram column IC-C4 (manufactured by Shimadzu Corporation)

Eluent: 3.0 mM oxalate+2.0 mM 18-crown-6-ether solution

Flow rate: 1.0 mL/min.

Column temperature: 40° C.

Example 1

(Preparation of $CaH_2$)

2 g of metal Ca (99.99%, manufactured by Aldrich Co.) was placed in an Ar-substituted tubular electric furnace made of stainless steel. After evacuating the inside of the electric furnace, hydrogen was introduced until a pressure in the electric furnace reached 2 MPa. Next, the temperature inside the electric furnace was raised from room temperature to 400° C. for 4 hours and subsequently heated at 400° C. for 10 hours. Thereafter, the mixture was cooled to room temperature to obtain $CaH_2$ powder.

(Preparation of Supported Ru Material)

1 g of the obtained $CaH_2$ powder was physically mixed with 0.042 g of $Ru_3(CO)_{12}$ powder (manufactured by Aldrich, 99%) in a glove box in an Ar atmosphere and sealed in a vacuum quartz glass tube. Next, the quartz glass tube was heated at 250° C. for 15 hours. As a result, a supported metal material in which 2 mass % of metal Ru was supported on $CaH_2$ (hereinafter referred to as $Ru/CaH_2$) was obtained. The BhT surface area of the supported metal material was 3.8 $m^2/g$. As shown below, ammonia synthesis was carried out using the supported metal material as a supported metal catalyst.

(Ammonia Synthesis Reaction)

A reaction in which nitrogen gas ($N_2$) and hydrogen gas ($H_2$) were reacted on a catalyst to produce ammonia ($NH_3$) (hereinafter referred to as an ammonia synthesis reaction) was carried out. 0.1 g of $Ru/CaH_2$ was packed in a glass tube reactor and the ammonia synthesis reaction was carried out in a fixed bed flow reactor. Both $N_2$ gas and $H_2$ gas as raw materials had a water content of 0.5 ppm or less. The flow rate of the raw material gas was set to $N_2$: 15 mL/min, $H_2$: 45 mL/min, total 60 mL/min, and the reaction was carried out at atmospheric pressure and the reaction temperature at 340° C.

(Ammonia Synthesis Rate)

The gas coming out of the fixed bed flow reactor was bubbled into a 0.005 M sulfuric acid aqueous solution to dissolve ammonia in the gas, and the resulting ammonium ion was quantitatively determined by ion chromatography using the above method. The ammonia synthesis rate at 340° C. was 4.0 mmol/g·h. The results are shown in Table 1.

Example 2

$SrH_2$ was obtained in the same manner as in Example 1 except that 1 g of metal Sr (manufactured by Aldrich, 99.99%) was used in place of the metal Ca in Example 1. A supported metal material in which 2 mass % of metal Ru was supported on $SrH_2$ (hereinafter referred to as $Ru/SrH_2$) was prepared in the same manner as in Example 1 except that $SrH_2$ was used instead of $CaH_2$ in Example 1. The BET specific surface area of $Ru/SrH_2$ was 3.3 $m^2/g$. Ammonia synthesis reaction was carried out under the same conditions as in Example 1 except that $Ru/SrH_2$ was used as a catalyst. The ammonia synthesis rate at a reaction temperature of 340° C. was 2.4 mmol/g·h. The results are shown in Table 1.

Example 3

$BaH_2$ was obtained in the same manner as in Example 1, except that 1 g of metal Ba (manufactured by Aldrich, 99.99%) was used in place of the metal Ca in Example 1. A supported metal material in which 2 mass % of metallic Ru was supported on $Ba/H_2$ (hereinafter referred to as $Ru/Ba/H_2$) was prepared in the same manner as in Example 1 except that $BaH_2$ was used instead of $CaH_2$ in Example 1. The BET specific surface area of $Ru/Ba/H_2$ was 4.2 $m^2/g$. Ammonia synthesis reaction was carried out under the same conditions as in Example 1 except that $Ru/Ba/H_2$ was used as a catalyst. The ammonia synthesis rate at a reaction temperature of 340° C. was 0.8 mmol/g·h. The results are shown in Table 1.

Comparative Example 1

A conductive Mayenite type compound (C12A7:e$^-$) was synthesized in accordance with the method described in Example 1 of WO2012/077658. As the Mayenite type compound, a Mayenite type compound having a molar ratio of Ca atom to Al atom of 11:14 was synthesized, and the corresponding C12A7:e− was obtained. The conductive electron concentration of C12A7:e− was $2\times10^{21}$ cm$^{-3}$.

A loading material in which 2 mass % Ru was supported (hereinafter referred to as Ru/C12A7:e−) was prepared under the same conditions as in Example 1 except that C12A7:e− was used. The BET specific surface area of the Ru/C12A7:e− was 1.0 m$^2$/g.

Ammonia synthesis reaction was carried out under the same conditions as in Example 1, using Ru/C12A7:e− as a catalyst. The ammonia synthesis rate at a reaction temperature of 340° C. was 1.6 mmol/g·h. The results are shown in Table 1.

Comparative Example 2

In accordance with the method described in Example 1 of WO2015/129471, a Ca$_2$N-supported material in which 2 mass % Ru was supported (hereinafter referred to as Ru/Ca$_2$N) was prepared. The BET specific surface area of the Ru/Ca$_2$N was 1.0 m$^2$/g. Ammonia synthesis reaction was carried out under the same conditions as in Example 1 using Ru/Ca$_2$N as a catalyst. The ammonia synthesis rate at a reaction temperature of 340° C. was 3.4 mmol/g·h. The results are shown in Table 1.

Comparative Example 3

A mixture was obtained by dispersing 2 g of MgO in THF solvent (60 mL) in which Ru$_3$(CO)$_{12}$ was dissolved. And then, a supported metal material in which 2 mass % Ru was supported on MgO (hereinafter referred to as Ru/MgO) was obtained by evaporating and drying the mixture by heating it at 450° C. in vacuum. Further, the Ru/MgO and CsCO$_3$ were mixed so that the molar ratio of Cs atoms/Ru atoms=1 and dispersed in ethanol. After stirring for 4 hours, a Ru catalyst in which Cs was added (hereinafter referred to as Cs—Ru/MgO) was obtained by evaporating the solvent to dryness.

The BET specific surface area of the Cs—Ru/MgO was 12 m$^2$/g. Ammonia synthesis reaction was carried out under the same conditions as in Example 1 except that Cs—Ru/MgO was used as a catalyst. The ammonia synthesis rate at 340° C. was 2.4 mmol/g·h. The results are shown in Table 1.

Comparative Example 4

A supported metal material in which 2 mass % of metal Ru was supported on CaO (hereinafter referred to as Ru/CaO) was prepared in the same manner as in Example 1 except that CaO was used instead of CaH$_2$ in Example 1. The BET specific surface area of the Ru/CaO was 3 m$^2$/g. Ammonia synthesis reaction was carried out under the same conditions as in Example 1 except that Ru/CaO was used as a catalyst. The ammonia synthesis rate at 340° C. was 0.3 mmol/g·h. The results are shown in Table 1.

Comparative Example 5

A supported metal material in which 2 mass % of metal Ru was supported on MgO (hereinafter referred to as Ru/MgO) was prepared in the same manner as in Example 1 except that MgO was used instead of CaH$_2$ in Example 1. The BET specific surface area of the Ru/MgO was 40 m$^2$/g.

Ammonia synthesis reaction was carried out under the same conditions as in Example 1 except that Ru/MgO was used as a catalyst. The ammonia synthesis rate at 340° C. was 0.3 mmol/g·h. The results are shown in Table 1.

(Comparison of Ammonia Synthesis Rates)

Table 1 shows the catalytic activity of the ammonia synthesis reaction by the catalyst in which metal Ru was supported on the support material of the present invention. From the viewpoint of the ammonia synthesis rates shown in Table 1, when compared with the catalyst in which the metal Ru or Cs—Ru was supported on the existing catalyst support shown in Comparative Examples 3 to 5, the Ru/CaH$_2$, the Ru/SrH$_2$, the Ru/BaH$_2$ were found to be a very excellent catalyst with high catalytic activity per mass, despite its small specific surface area. These catalyst activities were found to be higher than the above-mentioned Ru/C12A7:e− having the high catalytic activity shown in Comparative Example 1.

TABLE 1

| | Supported metal catalyst | BET specific surface area (m$^2$/g) | NH$_3$ synthesis rate (mmol/g · h) |
|---|---|---|---|
| Example 1 | Ru/CaH$_2$ | 3.8 | 4.0 |
| Example 2 | Ru/SrH$_2$ | 3.3 | 2.4 |
| Example 3 | Ru/Ba/H$_2$ | 4.2 | 0.8 |
| Comparative Example 1 | Ru/C12H7:c− | 1.0 | 1.6 |
| Comparative Example 2 | Ru/Ca$_2$N | 1.0 | 3.4 |
| Comparative Example 3 | Cs—Ru/MgO | 12 | 2.4 |
| Comparative Example 4 | Ru/CaO | 3.0 | 0.3 |
| Comparative Example 5 | Ru/MgO | 40 | 0.3 |

*Reaction temperature: 340° C.
Reaction pressure: 0.1 MPa
Gas flow rate: 60 mL/min (N$_2$:H$_2$ = 1:3(v/v))

Example 4

Ru/CaH$_2$ was prepared in the same manner as in Example 1 except that the Ru loading amount of Ru/CaH$_2$ in Example 1 was changed to 5 mass %. Ammonia synthesis reaction was carried out under the same conditions as in Example 1 except that the Ru/CaH$_2$ was used as a catalyst. The ammonia synthesis rate at 340° C. was 6.0 mmol/g·h. The results are shown in FIG. 1.

Example 5

Ru/CaH$_2$ was prepared in the same manner as in Example 1 except that the Ru loading amount of Ru/CaH$_2$ in Example 1 was changed to 10 mass %. An ammonia synthetic reaction was carried out under the same conditions as in Example 1 except that the Ru/CaH$_2$ was used as a catalyst. As shown in FIG. 1, the ammonia synthesis rate at 340° C. was 7.0 mmol/g·h. The results are shown in FIG. 1.

Example 6

Ru/CaH$_2$ was prepared in the same manner as in Example 1 except that the Ru loading amount of Ru/CaH$_2$ in Example 1 was changed to 15 mass %. An ammonia synthetic reaction was carried out under the same conditions as in Example 1 except that the Ru/CaH$_2$ was used as a catalyst. The ammonia synthesis rate at 340° C. was 5.3 mmol/g·h. The results are shown in FIG. 1.

Example 7

A supported metal material in which 2 mass % of metal Co was supported on CaH$_2$ (hereinafter referred to as Co/CaH$_2$) was prepared in the same manner as in Example 1 except that 0.058 g of Co$_2$(CO)$_8$ (manufactured by Kanto Kagaku Co., Ltd., 95%) was used in place of Ru$_3$(CO)$_{12}$ in Example 1. An ammonia synthesis reaction was carried out under the same conditions as in Example 1 except that Co/CaH$_2$ was used as a catalyst. The ammonia synthesis rate at 340° C. was 0.4 mmol/g·h. The results are shown in Table 2.

Example 8

A supported metal material in which 2 mass % of metal Fe was supported on CaH$_2$ (hereinafter referred to as Fe/CaH$_2$) was prepared in the same manner as in Example 1 except that 0.126 g of Fe$_2$(CO)$_9$ (manufactured by STREM CHEMICALS, 99%) was used in place of Ru$_3$(CO)$_{12}$ in Example 1. An ammonia synthesis reaction was carried out under the same conditions as in Example 1 except that Fe/CaH$_2$ was used as a catalyst. The ammonia synthesis rate at 340° C. was 0.2 mmol/g·h. The results are shown in Table 2.

Table 2 shows the results of ammonia synthesis activity at 340° C. of catalysts in which Ru, Co, or Fe were supported on the CaH$_2$ supports, respectively.

TABLE 2

| | Supported metal catalyst | BET specific surface area (m$^2$/g) | NH$_3$ synthesis rate (mmol/g · h) |
|---|---|---|---|
| Example 1 | Ru/CaH$_2$ | 3.8 | 4.0 |
| Example 7 | Co/CaH$_2$ | 3.8 | 0.4 |
| Example 8 | Fe/CaH$_2$ | 3.8 | 0.2 |

*Reaction temperature: 340° C.
Reaction pressure: 0.1 MPa
Gas flow rate: 60 mL/min (N$_2$:H$_2$=1:3(v/v))

Example 9

A supported metal material in which 2 mass % of metal Ru was supported on CeH$_2$ (hereinafter referred to as Ru/CeH$_2$) was prepared in the same manner as in Example 1 except that CeH$_2$ was used instead of CaH$_2$ in Example 1. The BET specific surface area of Ru/CeH$_2$ was 1.7 m$^2$/g. An ammonia synthesis reaction was carried out under the same conditions as in Example 1 except that Ru/CeH$_2$ was used as a catalyst. The ammonia synthesis rate at 340° C. was 2.8 mmol/g·h. The results are shown in Table 3.

Example 10

A supported metal material in which 2 mass % of metal Ru was supported on LaH$_n$ (hereinafter referred to as Ru/LaH$_n$) was prepared in the same manner as in Example 1 except that LaH$_n$ was used instead of CaH$_2$ in Example 1. The BET specific surface area of the Ru/LaH$_n$ was 1.3 m$^2$/g. An ammonia synthesis reaction was carried out under the same conditions as in Example 1 except that Ru/LaH$_n$ was used as a catalyst. The ammonia synthesis rate at 340° C. was 2.7 mmol/g, h. The results are shown in Table 3.

Example 11

A supported metal material in which 2 mass % of metal Ru was supported on YH$_2$ (hereinafter referred to as Ru/YH$_2$) was prepared in the same manner as in Example 1 except that YH$_2$ was used instead of CaH$_2$ in Example 1. The BET specific surface area of the Ru/YH$_2$ was 0.8 m$^2$/g. An ammonia synthesis reaction was carried out under the same conditions as in Example 1 except that Ru/YH$_2$ was used as a catalyst. The ammonia synthesis rate at 340° C. was 0.9 mmol/g·h. The results are shown in Table 3.

Table 3 shows the results summarizing ammonia synthesis activities at a reaction temperature of 340° C. using Ru/CaH$_2$ and the catalysts in which Ru was supported on the rare earth metal hydrides. It was found that both Ru/CeH$_2$ and Ru/LaH$_n$ show catalytic performance comparable to that of Ru/CaH$_2$.

TABLE 3

| | Supported metal catalyst | BET specific surface area (m$^2$/g) | NH$_3$ synthesis rate (mmol/g · h) |
|---|---|---|---|
| Example 1 | Ru/CaH$_2$ | 3.8 | 4.0 |
| Example 9 | Ru/CeH$_2$ | 3.3 | 2.8 |
| Example 10 | Ru/LaH$_n$ | 4.2 | 2.7 |
| Example 11 | Ru/YH$_2$ | 4.2 | 0.9 |

*Reaction temperature: 340° C.
Reaction pressure: 0.1 MPa
Gas flow rate: 60 mL/min(N$_2$:H$_2$ = 1:3(v/v))

As shown in Examples 1, 4, 5, and 6, the ammonia synthesizing activities by the CaH$_2$ catalysts having different Ru loading amounts at the reaction temperature of 340° C. were investigated. As a Ru loading amount was increased, a catalytic activity was greatly improved. The maximum activity was obtained at Ru loading amount of 10 mass %. It was also found that a catalytic activity tended to decrease when a loading amount was further increased to 15 mass %.

Example 12

Figure 2:
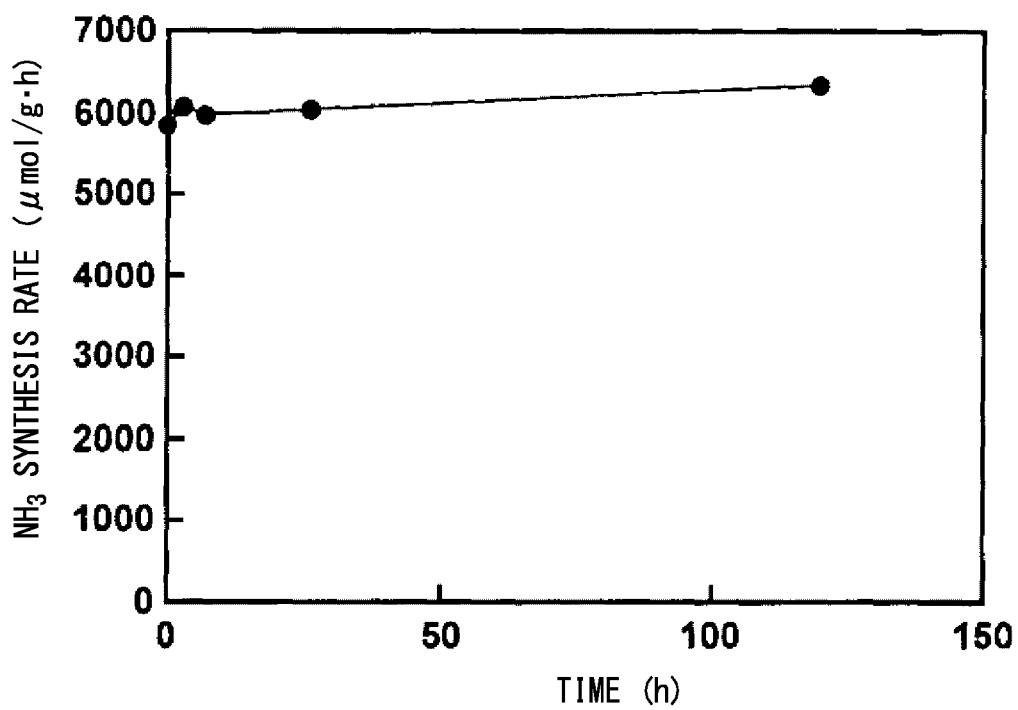
FIG. 2 is a graph showing a change of ammonia synthesis rates with time in Example 12.

A long-term stability of the catalyst was evaluated by carrying out ammonia synthesis reaction for 120 hours at 10 atmosphere (1.0 MPa) at a reaction temperature of 340° C., using 2 mass % Ru/CaH$_2$ of Example 1 as a catalyst. FIG. 2 shows the result. It was found that the catalyst of the present invention stably produced ammonia even in the reaction for 120 hours and hardly decreased the reaction activity.

Example 13

Figure 3:
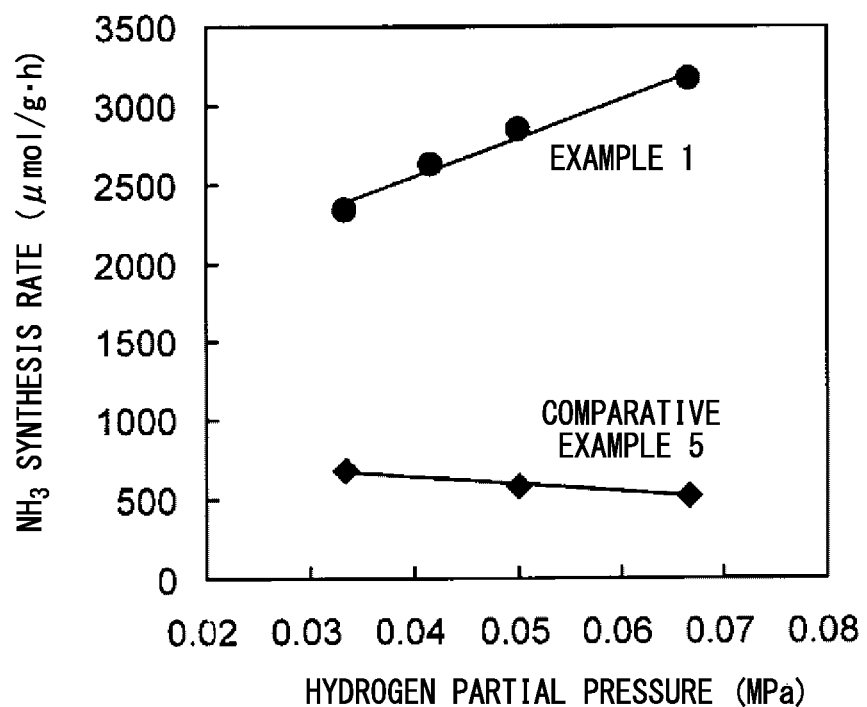
FIG. 3 is a graph showing results of Example 13 and Comparative Example 5.

An ammonia synthesis reaction was carried out in a gas atmosphere having different hydrogen partial pressures at a reaction temperature of 340° C. using 2 mass % Ru/CaH$_2$ of Example 1 as a catalyst. In the ammonia synthesis reaction, the nitrogen partial pressure was fixed at 0.017 MPa, and the hydrogen partial pressures were set to 0.03 MPa, 0.04 MPa, 0.05 MPa, and 0.07 MPa. Ar gas was flowed so that the total flow rate of the gas was adjusted to 60 mL/min. The results are shown in FIG. 3. In the catalyst (Ru/MgO) of Comparative Example 5 which is a general catalyst, the catalytic activity decreased with an increase of hydrogen partial pressure, but in the catalyst (Ru/CaH$_2$) of Example 1, the catalyst activity was greatly improved with an increase of hydrogen partial pressure. From these facts, it was found that Ru/CaH$_2$ is a catalyst which is hardly affected by hydrogen poisoning.

Example 14

Figure 4:
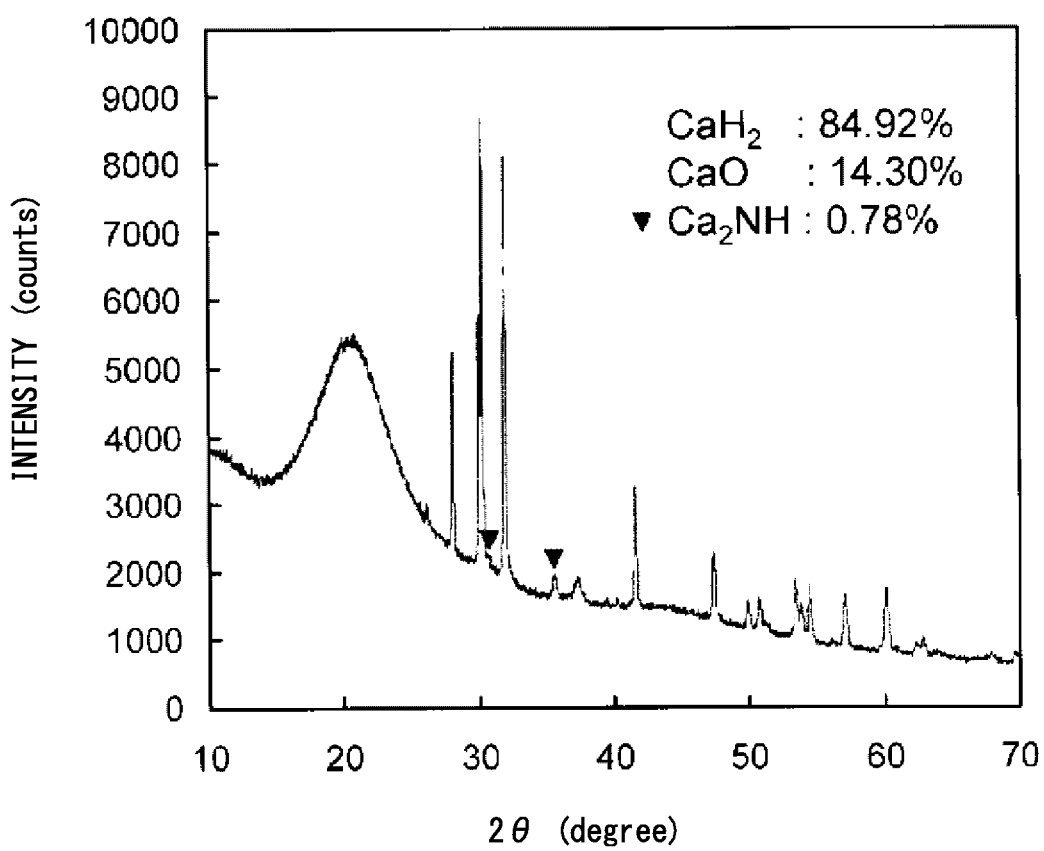
FIG. 4 is a diagram showing an X-ray diffraction pattern of a catalyst after an ammonia synthesis reaction in Example 14.

After an ammonia synthesis reaction was carried out for 70 hours at a reaction temperature of 340° C. using 2 mass % Ru/CaH$_2$ described in Example 1 as a catalyst, the X-ray diffraction pattern of the catalyst was measured. The results are shown in FIG. 4. Rietveld analysis revealed that the Ru/CaH$_2$ catalyst after the reaction contained 84.92% of CaH$_2$, 14.30% of CaO and 0.78% of Ca$_2$NH$_3$.

It is considered that the formation of CaO was due to oxidation of a trace amount of impurities (water or oxygen) contained at the time of preparing the catalyst or in the reaction gas. On the other hand, a peak derived from Ca$_2$NH$_3$ was observed. This suggests that nitrogen is incorporated into the framework of the crystal structure of CaH$_2$ during the reaction.

The effect of the supported metal material and the supported metal catalyst of the present invention may be caused by the dynamic role of hydride ion (H$^-$ ion) contained in the metal hydride. That is, when a supported metal material in which a transition metal such as Ru is supported on a metal hydride is heated, an H$^-$ ion in the supported metal material is desorbed as neutral hydrogen, and F center in which the deficient site is occupied by electron is generated. This situation is particularly likely to occur under a condition for producing ammonia. Since the valence of a metal ion generated from the metal hydride used in the present invention may be +2 or +3, the crystal has a larger lattice energy than an ionic crystal of an alkali metal or the like. Compared to an oxygen ion and a halogen ion, a hydride ion is characterized by that the ion (ionic) radius can be considerably changed depending on the environment. Therefore, when a hydride ion is replaced by electron, the energy levels of electron at the F center in the hydride crystal are not greatly reduced by relaxing the structure around the F center which is different from the case found in alkali metal oxide and halide. And it is presumed that the energy levels are kept high. So, by decreasing the work function of the supported metal material itself, donating an electron to the metal supported on a support becomes more efficient. As a result, the catalytic activity of the metal species may be promoted. In addition, as described above, since the F center and the local structure when the original hydride ion exists in the defect site are not significantly different, the reversible exchange of hydride ion and electron may occur smoothly.

The invention claimed is:

1. A catalyst, comprising:
a supported metal material comprising:
at least one transition metal selected from the group consisting of Ru, Co and Fe, and
a support loading the transition metal,
wherein the support is a metal hydride represented by formula (1):

$$XH_n \qquad (1)$$

wherein, X represents at least one atom selected from the group consisting of Mg, Ca, Sr, Ba, Sc, Y and lanthanoid atoms, and n is in a range of 2≤n≤3, and
wherein the catalyst catalyzes the production of ammonia from nitrogen and hydrogen gases.

2. A method of producing ammonia, comprising:
bringing a raw material gas containing hydrogen and nitrogen into contact with the catalyst according to claim 1 to obtain ammonia.

3. The method of producing ammonia according to claim 2, wherein a reaction temperature when bringing the raw material gas into contact with the catalyst is from 100° C. to 600° C.

4. The method of producing ammonia according to claim 2, wherein a reaction pressure when bringing the raw material gas into contact with the catalyst is from 10 kPa to 20 MPa.

5. The method of producing ammonia according to claim 2, wherein a water content of the raw material gas is 100 ppm or less.

6. The method of producing ammonia according to claim 2, wherein a volume ratio of hydrogen to nitrogen (H$_2$/N$_2$ (volume/volume)) when bringing the raw material gas into contact with the catalyst is 0.4 or more.

7. The catalyst according to claim 1, wherein a loading amount of the transition metal with respect to the support is 0.01% to 30 mass %.

8. The catalyst, according to claim 1, wherein the metal hydride is CaH$_2$.

* * * * *